United States Patent [19]
Keatch

[11] Patent Number: 6,042,713
[45] Date of Patent: Mar. 28, 2000

[54] METHOD FOR REMOVING METAL CONTAMINANTS

[76] Inventor: Richard Keatch, Keatch Chemicals, Unit 27, Frederick St Centre, Aberdeen AB2 1HY, United Kingdom

[21] Appl. No.: 09/053,481

[22] Filed: Apr. 1, 1998

[30] Foreign Application Priority Data

| Apr. 1, 1997 | [GB] | United Kingdom | 9706608 |
| May 27, 1997 | [GB] | United Kingdom | 9710819 |
| Mar. 5, 1998 | [GB] | United Kingdom | 9804601 |

[51] Int. Cl.⁷ .................................................... C25F 1/00
[52] U.S. Cl. .................... 205/705; 205/712; 205/714; 205/717; 205/722; 205/741; 204/242; 204/271; 588/204

[58] Field of Search ................................. 205/705, 712, 205/714, 717, 722, 741; 204/242, 271; 588/204

[56] References Cited

U.S. PATENT DOCUMENTS 3,779,879 12/1973 Scott .......................................... 205/717
4,264,420 4/1981 Tomaszewski ........................... 205/717

*Primary Examiner*—Arun S. Phasge
*Attorney, Agent, or Firm*—Madson & Mercalf

[57] ABSTRACT

A device and method for removing metal or mineral deposits from surfaces (eg. surfaces of oil drilling equipment) by creating an electrochemical cell of which the contaminated surface is a part.

36 Claims, 2 Drawing Sheets

METHOD FOR REMOVING METAL CONTAMINANTS

This invention relates to a device and method for removing metal or mineral deposits (eg scales) from surfaces, in particular from the surfaces of drilling machinery in the oil industry.

The deposition of metals onto surfaces can be undesirable in many industrial applications. In the oil industry radioactive metals such as lead 210 can deposit on steel process equipment, downhole tools and tubular structures. This may lead to problems relating to operational efficiency due to the safety implications of dealing with gamma emitting isotopes. The adherence of radioactive non-ferrous metals to steel surfaces can occur as a result of contact and deposition of radioactive elements naturally present in oil field fluids and gases.

The removal of a radioactive elemental metal is not readily achieved by chemical means since the metal contaminant may form partially within the metal matrix of the near surface. Most chelating agents are effective only when a metal salt is to be removed. The use of strong acids to remove metal or mineral deposits may result in surface corrosion and damage to the contaminated equipment.

Mineral scale deposition may occur on surfaces of, for example, down hole tools in oil fields, as a result of precipitation of water insoluble salts. These are formed as a result of the mixing of incompatible connate water (present in the pores of the reservoir rock) with injection water such as sea water. The connate water may be rich in calcium, barium and strontium ions and when mixed with sulphate rich sea water may form sulphate scale. The deposition of scale on surfaces may result in production damage due to the formation of flow restrictions.

Thus there is generally a need for improved non-chemical methods for removing metal and mineral contaminants from surfaces.

The present invention seeks to fulfil this need by providing an improved method of removing metal contaminants from the surfaces of machinery and the like based on an electrochemical technique. The invention is particularly useful in the oil and gas industry where the production of hydrocarbons is often accompanied by water containing naturally occurring radioactive materials.

According to a first aspect of the present invention there is provided an apparatus for removing metal or mineral deposits from a surface to be treated, the apparatus comprising:

first means for applying a potential to the metal deposits;
second means for oxidising the deposits; and
third means for applying an opposite potential to the surface potential of the surface to be treated.

Advantageously, the first means comprises a first electrode, the second means comprises an electrolyte and the third means comprises a second electrode.

According to a second aspect of the present invention there is provided a method for removing metal or mineral deposits from a surface to be treated, the method comprising the steps of:

applying a potential to the surface to be treated;
providing an electrolyte to contact the surface to be treated;
providing a second electrode of opposite potential to the surface potential of the surface to be treated.

By means of the present invention, a potential is applied to the surface to be decontaminated or treated. The electrolyte is provided to contact the surface to be treated, and a second electrode (of opposite potential to the surface potential of the surface to be treated) is contacted with the electrolyte either directly or indirectly thus forming an electrolytic cell.

The step of applying a potential to the surface to be treated may be achieved by a first electrode. The choice of whether the first electrode is an anode or a cathode will depend on the nature of the contaminant to be removed and/or the nature of the surface to be treated. Preferably, the cathode is contained within a porous hollow matrix of a material such as chalk or filtration medium which allows ions to enter, contact the cathode, precipitate as metal and remain entrapped within the void between the cathode and porous coating on removal from the system. The configuration of the contaminated system may require provision of more than one cathode and/or anode. The second electrode may be in contact with a second electrolyte which is in electrical contact with the first electrolyte thus forming an electrolytic cell. Preferably, the second electrode is removably contactable with the electrolyte.

The material used to form the electrodes and the materials used to form the electrolyte will depend on the surface to be treated and on the composition of the contaminant or contaminants.

In a preferred embodiment of the present invention, metal contaminants (eg lead) may be removed from a surface to be treated and reprecipicated or concentrated onto a removable second electrode.

In a particularly preferred embodiment, the method according to the invention in a further step prevents or inhibits further contamination by coating the surface with an inhibition coating (eg. a coating which inhibits corrosion or scale deposits). $Fe_2O_3$ is one such useful corrosion inhibition coating.

Mineral scale contamination of the surfaces may be removed in a preferred embodiment of the invention by adding proprietary dissolving agents such as conventional chelating agents or acids. The present invention allows the dissolution rate to be enhanced over conventional methods. Thus for example a water insoluble metal salt such as barium sulphate or an oxide such as ferric oxide may be removed by carrying out dissolution in a dissolving agent and by applying a negative voltage to the contaminated metal surface. Similarly the derusting rate of corroded steel surfaces may be enhanced by using the invention in association with appropriate chemical solutions (eg by applying a positive voltage to the corroded surface). In these embodiments, the contaminant scale may be solubilised and where appropriate, certain elements (eg. radioactive elements) removed by selective concentration. Alternatively, reprecipitation of the elements may be achieved by various means including electrochemical means.

In some cases, the geometrical configuration of the structure having the metal surface to be treated or decontaminated may make it difficult to apply conventionally shaped electrodes. Advantageously, the apparatus according to the present invention comprises a substantially spherical cell comprising a metal surface forming the first electrode and an internal chamber forming the second electrode. The substantially spherical cell may be conveniently formed from a mild steel ball in which a hole has been drilled. The surface of the steel ball forms an anodic surface and the chamber formed by the hole drilled into the ball comprises a cathodic chamber. Preferably, the apparatus further comprises working means for electrically isolating the cathodic chamber and anodic surfaces of the ball. Preferably, the working means comprises a non-conducting tube having a length substantially equal to the internal diameter of the ball, which tube is fitted into the hole formed in the ball. The tube may be fitted with an electrical cell at one end. Advantageously, the electrical cell comprises one or more button cells. The shape and configuration of the non-conducting tube is such that, when the tube is inserted into the hole of the steel ball, the anode is outwardly orientated and sits proud of the tube. The negative terminal of the cell is situated inside the tube. Advantageously, the tube is formed from a plastics material. The tube, when fitted within the steel ball, is shaped and configured such that the anode contacts the inner surface of the ball and is fixed in position. Preferably, the tube further comprises a mesh for preventing freshly precipitated contaminant from escaping from the cathodic chamber whilst allowing electrolyte to flow freely through the chamber. Conveniently, the apparatus further comprises a metal matrix which provides a surface onto which the contaminated metal may plate. Preferably, the metal matrix is formed from zinc. This is useful for removing lead 210 from a metal surface. In use, one or more spherical cells may be placed within an electrolyte and allowed to roll across the contaminated surface within the electrolyte. Advantageously, the apparatus further comprises means for allowing the electrolyte to flow in a closed loop system. The design of the cell and the free flow of the electrolyte is such that the electrolyte may flow freely into and out of the cathodic chamber of the steel ball freely.

In an alternative embodiment, the apparatus of the invention comprises a substantially disc shaped cell. Advantageously, the disc shaped cell comprises a silicon wafer, comprising a surface which is corrugated or in the form of either a sign wave, square wave or saw tooth. Thus, the cross-sectional shape of the disc shaped cell is such that valleys are formed between the corrogations or peaks formed in the surface of disc shaped cell. This means that more than one metal may be coated onto the surface of the disc shaped cell, the first metal occupying the valleys and the second metal forming a layer on the peaks in the surface. This allows the contaminant metal to be removed from a surface when contacted by the disc and suitable electrolyte. Preferably, the disc is initially coated with zinc which fills valleys formed in surface of the disc. Particularly preferably the disc is then further coated with titanium. Because of the surface configuration of the disc, zinc and titanium are in electric isolation but can both contact an electrolyte which is preferably acidic. Preferably, the discs have a diameter of approximately 200 microns. The geometry of these cells is not limited to disc shapes and the cells may, for example, be spheres, rough particles of any suitable shape. Additionally, it may be desirable to incorporate material into the discs which allows them to be isolated by the application of a magnetic field or material which gives the disc itself magnetic properties. For example, the use of iron or magnetite could be used on part of the disc which would allow contaminated discs to be removed by flowing the suspension passed magnets. If the discs have a magnetic surface they can be made to orientate themselves suitably onto a contaminated steel surface. Removal would then require a certain flow rate to overcome the attraction or else the magnetic layer could be made to dissolve after a certain time once the decontamination process is complete.

Preferably, the apparatus of the invention further comprises a removal agent for assisting the removal of contaminant metals ions from the electrolyte. Advantageously, the removal agent comprises a solution of a metal salt such as a nitrate of a metal having a lower electro-negativity than the contaminants. Advantageously, the removal agent comprises zirconium nitrate which may be used for example to oxidise metallic lead to form lead ions. Zirconium nitrate is particularly preferably used together with an oxidising agent. $H_2O_2$ is an especially preferred oxidising agent because it has been found to be non-corrosive.

BRIEF DESCRIPTION OF THE DRAWINGS

Embodiments of the invention will now be further described by way of example only, with reference to the accompanying drawings in which:

Referring to FIG. 1 an apparatus for removing contaminants from a surface to be treated is designated generally by the reference numeral 1. The apparatus 1 comprises a substantially spherical steel ball 2 in which a hole 3 has been formed by, for example, drilling. Into the hole 3 is positioned a non-conducting tube 4 made of, for example, a plastics material. At one end of the tube is positioned an electrical cell 5 in the form of a button cell, a zinc matrix 6 and a mesh 7. The cavity 8 acts as a cathodic chamber. The steel ball 2 is used to decontaminate a steel surface 8 which has been contaminated. The steel surface is positioned in an electrolyte solution. In the present example, the surface 8 has been contaminated with lead 210 designated by the reference numeral 10.

Figure 1:
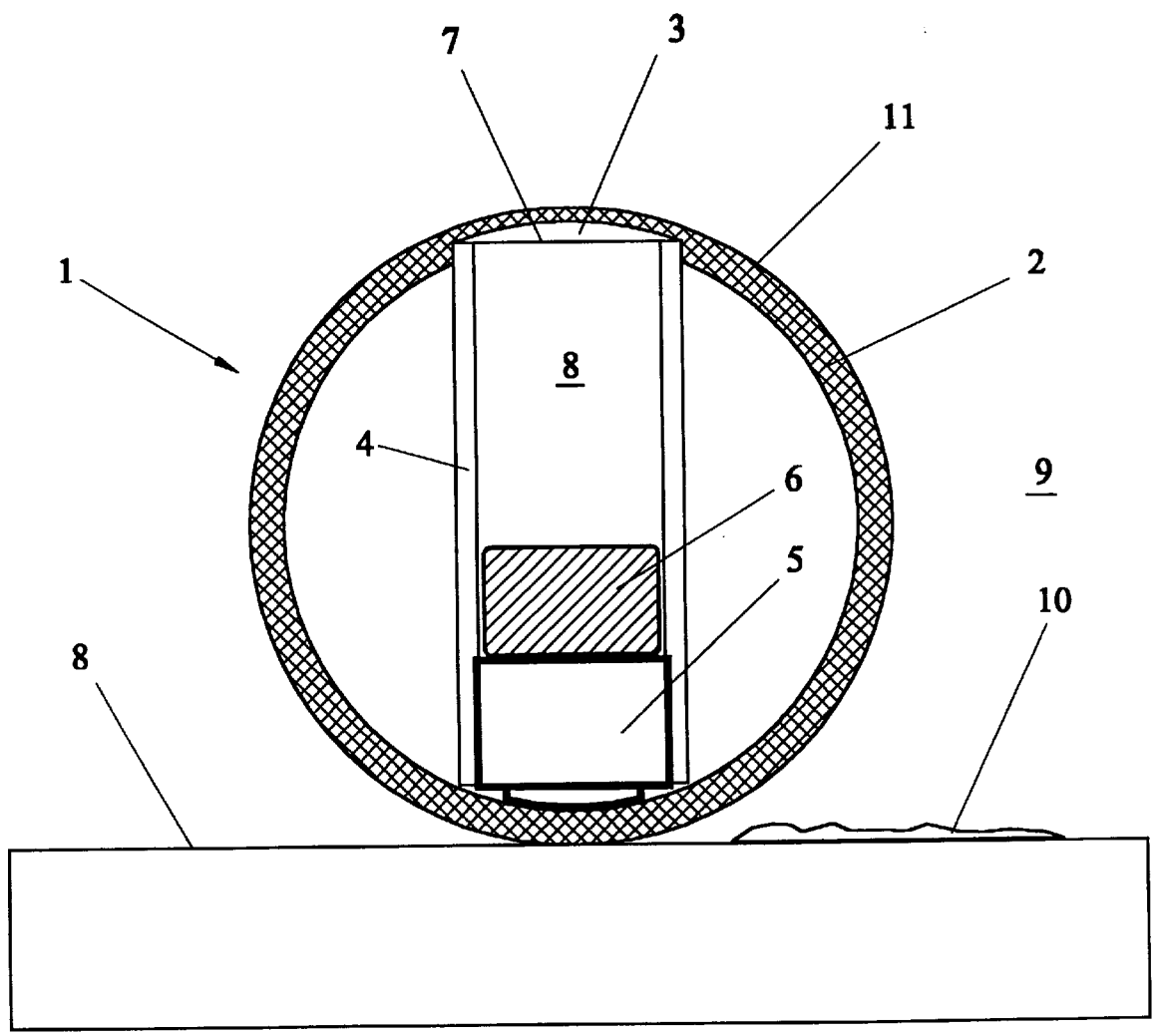
FIG. 1 is the schematic representation of an apparatus for removing deposits from the surface to be treated according to the present invention.

The surface 11 of the steel ball acts as an anode. The cathodic chamber 8 and the anode 11 are electrically separated from one another by means of the plastics tube 4.

The steel ball may be used on its own or with other steel balls and may be made to roll around in the electrolytic solution 9 over the surface 8 to be decontaminated. This allows electrolyte 9 to flow freely in a closed loop system for example into and out of the cathodic chamber.

Agitation of the steel balls should be sufficient to allow free flow of the electrolyte 9 into the cathodic chamber 8 but if this is not enough, port holes may be formed in the chamber 8 so that electrolyte density gradients help to maintain a circulation within the chamber. In addition, a freely moving ball 2 will act as a piston when the ball rolls causing the electrolyte 9 to be exchanged as the ball rolls.

Depending on the nature of the decontaminant, at some stage in the decontamination process gas bubbles may form in the cathodic chamber 8. These are undesirable if the decontamination procedure is incomplete and should either be removed by the provision of a chemical scavenger or be allowed to escape through the mesh 7.

The mesh 7 also serves to prevent freshly precipitated contaminant from escaping from the cathodic chamber 8, whilst allowing electrolyte 9 to flow freely into the cathodic chamber 8. The zinc matrix 6 serves as a surface onto which the contaminant may plate. Zinc is useful where the contaminant is lead 210. The zinc matrix may be positioned such that it is in contact with the cathode 5 in order to aid the contaminant metal deposition process.

Figure 2A:
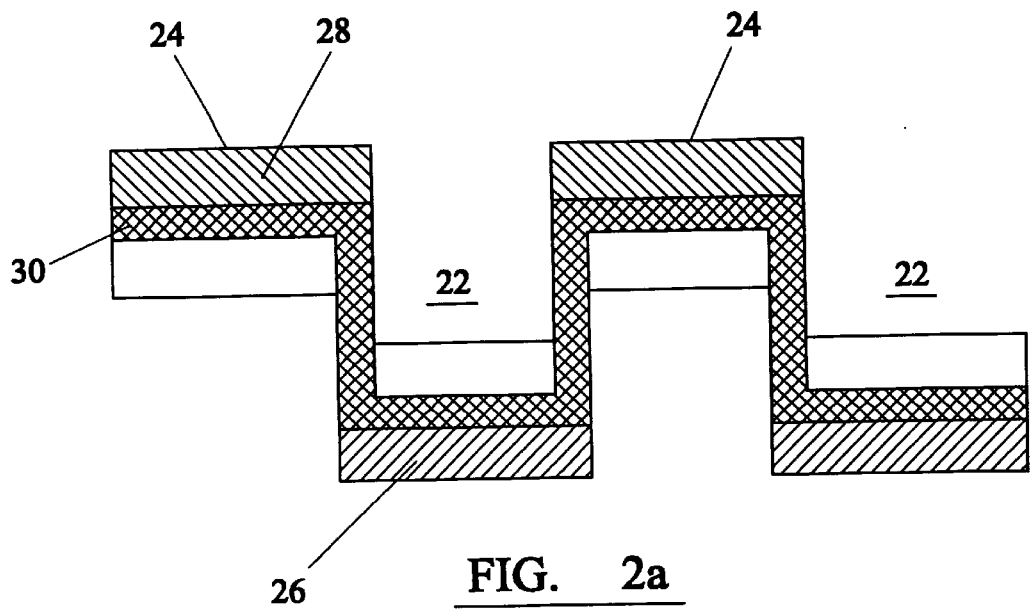
FIGS. 2a and 2b are schematic representations of a second embodiment of an apparatus for removing contaminants from the surface to be treated according to the present invention.
Figure 2B:
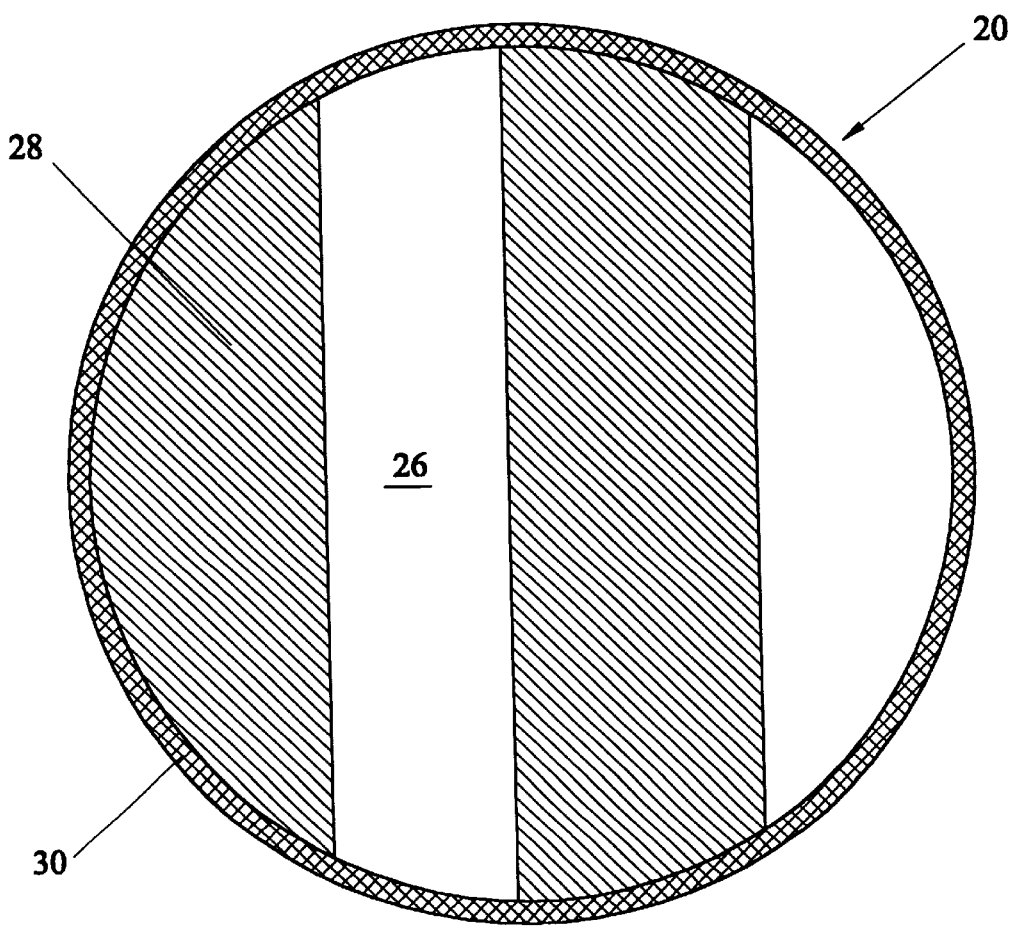

Referring to FIGS. 2a and 2b, a second embodiment of the present invention is described. The apparatus for removing contaminants from a surface to be treated comprises a micro disc designated generally by the reference numeral 20. A micro disc is formed from a material such as silicon wafer 30 and is manufactured such that the cross-sectional shape of the surface of the cell 20 is either corrugated or in the form of a sign wave, square wave or saw tooth. Referring to FIG. 2a, a cross-sectional view of the surface reveals a square wave configuration. This means that the surface of the disc 20 comprises valleys 22 and peaks 24, The configuration allows more than one metal to be coated onto the disc 20 which allows contaminants to be removed from a surface when contacted by the disc 20 in conjunction with a suitable electrolyte.

In the present example, the disc 20 is initially coated with zinc 26 on both sides of the disc in such a manner that the zinc is positioned in the valleys of the disc 20. The disc is then coated on both sides with titanium 28 in such a manner that the titanium is positioned on the peaks 24 of the disc 20. This means that the two metals are in electric isolation but can both contact an electrolyte which may be, for example, acidic.

The titanium is able to contact the lead 210 which is contaminating the surface 8 and causes a potential to be set up resulting in the oxidation of the metallic lead. The lead ions are then reduced when they come into contact with the zinc coated areas of the disc. The discs may be made with a diameter of around 200 microns which allows them to be easily suspended in an electrolyte.

Alternatively, a powder base may be formed depending on the application to which the discs are to be put.

In the present example, in which lead 210 has contaminated a steel surface 8, the surface 8 may be decontaminated by using a solution of metal salts such as a nitrate of a metal with a lower electro-negativity than the contaminant. For example, zirconium nitrate may be used to oxidise metallic lead to form lead ions, optionally in the presence of an oxidising agent such as $H_2O_2$.

A suspension of a second metal (zinc for example) can reduce the lead ions to form metallic lead on the surface of the zinc. Alternatively galvanised iron fines can be used so that following decontamination they can readily be removed from solution using magnets. In this case, it is desirable that the zinc particles do not contact the metal surface so that the geometry surface can be optimised by forming the zinc layer inside of an insulated porous sphere for example or in the valleys of the square wave discs described hereinabove.

The method according to the invention will now be described in a non-limiting fashion with reference to the following examples:

EXAMPLE 1

A mild steel pipe contaminated with lead-210 may be decontaminated by contacting said surface with an electrolyte such as lead nitrate at a concentration of for example, 0.01M. A positive potential is applied to the metal surface in order to create an anode. A second electrode (the cathode) is made to contact the same electrolyte and may be composed of various conductive materials such as mild steel for example. When a voltage is applied (typically 3V) the lead-210 on the anode surface starts to enter the solution as ions soluble lead ions are precipitated as metallic lead at the cathode. As the dissolution of lead proceeds, oxidation of the anodic uncontaminated areas of the steel surface results in the formation of a layer of iron oxide as magnetite $Fe_2O_3$. This is a useful protective coating against corrosion. As the reaction continues, eventually all the lead contaminant is removed from the steel surface and this results in the onset of oxygen discharge at the anode. Oxygen evolution can thus be used as a marker for decontamination of the metal surface. In cases where the evolution of oxygen cannot be seen eg. in the decontamination of pipes, the reaction can be monitored by appropriate means, eg. polarography. As electrolysis proceeds, the lead ions in the electrolyte (both radioactive and non-radioactive) continue to precipitate as metal on the cathode surface. As this occurs the pH of the electrolyte decreases and eventually, given sufficient potential, hydrogen gas will be evolved at the cathode. Evolution of hydrogen can therefore be used as a marker for the complete removal of lead from solution and the cathode can be removed and disposed of as radioactive waste, leaving the previously contaminated metal surface decontaminated and coated with a protective layer of iron oxide. As the lead tends to form an amorphous gelatinous layer on the cathode during deposition, it is desirable to stabilise the lead formed and ease the removal and disposal processes. Various additives can be included in the electrolyte in order to facilitate plating of lead.

EXAMPLE 2

The dissolution of mineral scale comprising a salt such as barium sulphate or an oxide such as ferric oxide can be significantly enhanced in a dissolver by applying a negative voltage to the scaled metal surface. The electrolyte in this case could be for instance a solution of pentapotassium diethylene triamine penta-acetate (20%w/w), potassium carbonate (15%w/w), potassium formate (10%w/w) and potassium hydroxide (1.0 w/w) at a concentration of say, 35%w/v in water. A mild steel anode can be utilised to complete the electrolytic cell, at a potential of 10V, for example, and the dissolution rate of the sulphate scale can be increased by a factor of 1.9 over a 6 hour period at 20 C under static conditions and scale:dissolver ratio of 5% w/v. Under more favourable conditions the dissolution rate may be further optimised.

EXAMPLE 3

The derusting rate of corroded steel surfaces may be enhanced by using the present invention in association with various chemical solutions. The process involves providing an appropriate positive potential to the corroded metal surface relative to the particular type of cathode and electrolytes used. Once the surface is clean, it is possible to passivate the new surface by increasing the alkalinity of the electrolyte whereby to lay down a protective coating of $Fe_2O_3$.

I claim:

1. An apparatus for decontaminating oil field equipment by removing metal or mineral deposits from a surface to be treated, wherein the metal or mineral deposits are radioactive non-ferrous metals, the apparatus comprising:
   a first-electrode for applying a potential to the metal deposits;
   an electrolyte for oxidizing the deposits, wherein the electrolyte comprises an oxidizing anion; and
   a second electrode for applying an opposite potential to the surface to be treated.

2. An apparatus as claimed in claim 1 wherein the metal or mineral deposits are radioactive decay products of U-238 or Th-232.

3. An apparatus as claimed in claim 1 wherein said second electrode is removably contactable with said electrolyte.

4. An apparatus as claimed in claim 1 wherein said first and second electrode are part of a substantially spherical cell comprising a metal surface forming the first electrode and an internal chamber forming the second electrode.

5. An apparatus as claimed in claim 4 wherein said first electrode is anodic and said second electrode is cathodic, said apparatus comprising means for electrically isolating the anodic surface and cathodic chamber.

6. An apparatus as claimed in claim 5 wherein the isolating means is a non-conducting tube, optionally comprising a mesh for preventing contaminant from escaping the chamber.

7. An apparatus as claimed in claim 1 comprising a micro cell selected from the group consisting of spheres, discs and rough particles.

8. An apparatus as claimed in claim 7 comprising a disc-shaped cell.

9. An apparatus as claimed in claim 7 wherein the cross-sectioned shape of the micro cell comprises peaks and valleys.

10. An apparatus as claimed in claim 9 wherein the cross-sectioned shape is corrugated or substantially in the form of sine wave, square wave or saw tooth.

11. An apparatus as claimed in claim 9 wherein the valleys are coated with zinc and the peaks with titanium.

12. An apparatus as claimed in claim 1 wherein the metal or mineral deposit comprises Pb-210.

13. An apparatus as claimed in claim 1 wherein the surface to be treated is ferrous.

14. An apparatus as claimed in claim 13 wherein the surface to be treated is steel-based.

15. An apparatus as claimed in claim 1 wherein the anion is a nitrate ion.

16. An apparatus as claimed in claim 15 wherein the nitrate is present as zirconium nitrate.

17. An apparatus as claimed in claim 16 wherein the electrolyte contains $H_2O_2$.

18. An apparatus as claimed in claim 15 wherein the nitrate is present as lead nitrate.

19. An apparatus as claimed in claim 18 wherein the second electrode is a sacrificial electrode upon which Pb precipitates.

20. An apparatus as claimed in claim 1 wherein the metal or mineral deposits are located on a first portion of the surface to be treated and a second portion of the surface to be treated is uncontaminated, and wherein the electrolyte is selected to convert the uncontaminated portion of the surface to $Fe_2O_3$.

21. A method for decontaminating oil field equipment by removing metal or mineral deposits from a surface to be treated, wherein the metal or mineral deposits are radioactive non-ferrous metals, the method comprising the steps of:
  applying a potential to the surface to be treated using a first electrode; and
  providing an electrolyte to contact the surface to be treated using a second electrode to provide a potential opposite to the potential surface of the surface to be treated, wherein the electrolyte comprises an oxidizing anion.

22. A method as claimed in claim 21 further comprising the step of coating the surface to be treated with an inhibition coating.

23. A method as claimed in claim 12 wherein the anion is a nitrate ion.

24. A method as claimed in claim 23 wherein the nitrate is present as zirconium nitrate.

25. A method as claimed in claim 24 wherein the electrolyte contains $H_2O_2$.

26. A method as claimed in claim 23 wherein the nitrate is present as lead nitrate.

27. A method as claimed in claim 26 wherein the second electrode is a sacrificial electrode upon which Pb precipitates.

28. A method as claimed in claim 21 for removing a metal from a surface to be treated comprising a further step of reprecipitating or concentrating the removed metal onto a removable second electrode.

29. A method as claimed in claim 21 comprising the addition of a removal agent optionally together with an oxidizing agent.

30. A method as claimed in claim 21 for removing scale deposits comprising the addition of a dissolving agent.

31. A method as claimed in claim 21 wherein the metal or mineral deposit comprises Pb-210.

32. A method as claimed in claim 21 wherein the surface to be treated is ferrous.

33. A method as claimed in claim 21 wherein the surface to be treated is steel-based.

34. A method as claimed in claim 21 wherein the metal or mineral deposits removed are radioactive decay products of U-238 or Th-232.

35. A method as claimed in claim 21 wherein the metal or mineral deposits are located on a first portion of the surface to be treated and a second portion of the surface to be treated is uncontaminated, further comprising the step of converting the uncontaminated portion of the surface to $Fe_2O_3$.

36. An apparatus for decontaminating oil field equipment by removing metal or mineral deposits from a steel-based surface to be treated, wherein the metal or mineral deposits are radioactive non-ferrous metals located on a first portion of the surface to be treated and a second portion of the surface to be treated is uncontaminated, the apparatus comprising:
  a first-electrode for applying a potential to the metal deposits;
  an electrolyte containing an oxidizing anion for oxidizing the uncontaminated portion of the surface to be treated to $Fe_2O_3$; and
  a second electrode for applying an opposite potential to the surface to be treated.

* * * * *